(12) United States Patent
Liu

(10) Patent No.: US 10,195,928 B2
(45) Date of Patent: Feb. 5, 2019

(54) QUARTER WINDOW ASSEMBLY FOR A VEHICLE DOOR AND METHOD OF MAKING THE ASSEMBLY

(71) Applicant: SAINT-GOBAIN GLASS FRANCE, Courbevoie (FR)

(72) Inventor: Lu Liu, Shanghai (CN)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

(21) Appl. No.: 14/647,310

(22) PCT Filed: Jan. 26, 2014

(86) PCT No.: PCT/CN2014/071509
§ 371 (c)(1),
(2) Date: May 26, 2015

(87) PCT Pub. No.: WO2014/121706
PCT Pub. Date: Aug. 14, 2014

(65) Prior Publication Data
US 2015/0298531 A1 Oct. 22, 2015

(30) Foreign Application Priority Data

Feb. 8, 2013 (CN) .......................... 2013 1 0050634
Feb. 8, 2013 (CN) ..................... 2013 2 0072897 U

(51) Int. Cl.
*B60J 10/74* (2016.01)
*B60J 1/10* (2006.01)
(Continued)

(52) U.S. Cl.
CPC ......... *B60J 10/74* (2016.02); *B29C 45/14065* (2013.01); *B29C 45/14377* (2013.01);
(Continued)

(58) Field of Classification Search
CPC .... B60J 10/74; B60J 10/78; B60J 1/10; B29C 45/1418; B29C 45/14418; B29C 45/14934
See application file for complete search history.

(56) References Cited

U.S. PATENT DOCUMENTS 5,306,459 A * 4/1994 Thomason ........ B29C 45/14418
264/266
5,454,706 A * 10/1995 Midorikawa ..... B29C 45/14418
249/91
(Continued)

FOREIGN PATENT DOCUMENTS

CN           1855453 A     11/2006
CN         102361289 A      2/2012
(Continued)

OTHER PUBLICATIONS

First Office Action as issued in Japanese Patent Application No. 2015-556385, dated Aug. 2, 2016.
(Continued)

*Primary Examiner* — Gregory J Strimbu
(74) *Attorney, Agent, or Firm* — Pillsbury Winthrop Shaw Pittman LLP

(57) ABSTRACT

A guide rail for guiding movements of a vehicle window, includes a first structure extending below a beltline of a vehicle door and a second structure extending above the beltline. The second structure includes a bottom wall, a side wall disposed on a first surface of the bottom wall, and an extension part disposed on a second surface of the bottom wall. The second surface is opposite to the first surface. A groove is formed by the bottom wall and the extension part, and has an opening defined by a surface of the extension part and a surface of the bottom wall. A plastic protrusion part is disposed on the surface of the extension part and partially surrounds the groove. The bottom wall is provided with a
(Continued)

first opening, two second openings and a third opening. A part of the bottom wall between the two second openings forms a block.

11 Claims, 8 Drawing Sheets

(51) Int. Cl.
| | | |
|---|---|---|
| *B60J 1/17* | (2006.01) | |
| *B29C 45/14* | (2006.01) | |
| *B60J 5/04* | (2006.01) | |
| *F16C 29/00* | (2006.01) | |
| *B60J 10/78* | (2016.01) | |
| *B29K 309/08* | (2006.01) | |
| *B29L 31/30* | (2006.01) | |
| *E05F 11/38* | (2006.01) | |

(52) U.S. Cl.
CPC .. *B29C 45/14418* (2013.01); *B29C 45/14434* (2013.01); *B60J 1/10* (2013.01); *B60J 1/17* (2013.01); *B60J 5/04* (2013.01); *B60J 10/78* (2016.02); *F16C 29/005* (2013.01); *B29K 2309/08* (2013.01); *B29L 2031/3041* (2013.01); *E05F 11/382* (2013.01)

(56) References Cited

U.S. PATENT DOCUMENTS

| | | | | |
|---|---|---|---|---|
| 6,123,535 | A * | 9/2000 | Ash | B29C 33/0044 |
| | | | | 425/125 |
| 6,461,137 | B1 * | 10/2002 | Ash | B29C 33/0044 |
| | | | | 264/252 |
| 6,814,359 | B2 * | 11/2004 | Senda | H01G 9/10 |
| | | | | 277/612 |
| 2004/0108614 | A1 * | 6/2004 | Junker | B29C 45/14065 |
| | | | | 264/46.4 |
| 2006/0156632 | A1 * | 7/2006 | Ruppert | B29C 45/14377 |
| | | | | 49/502 |
| 2006/0198921 | A1 * | 9/2006 | Fujita | B29C 44/351 |
| | | | | 425/542 |
| 2008/0116713 | A1 * | 5/2008 | Jun | B60J 5/0402 |
| | | | | 296/146.2 |
| 2009/0162957 | A1 * | 6/2009 | Joung | B29C 45/14418 |
| | | | | 438/27 |
| 2011/0290953 | A1 | 12/2011 | Bleus et al. | |
| 2012/0144751 | A1 * | 6/2012 | Schapitz | B60J 10/78 |
| | | | | 49/431 |

FOREIGN PATENT DOCUMENTS

| | | |
|---|---|---|
| CN | 203318113 U | 12/2013 |
| JP | S48-58056 A | 8/1973 |
| JP | S63-69612 A | 3/1988 |
| JP | 2001-071752 A | 3/2001 |
| JP | 2002-172933 A | 6/2002 |
| JP | 2006-123633 A | 5/2006 |
| JP | 2006-218666 A | 8/2006 |
| JP | 2007-276686 A | 10/2007 |

OTHER PUBLICATIONS

International Search Report and the Written Opinion of the International Searching Authority as issued in International Patent Application No. PCT/CN2014/071509, dated May 6, 2014.

First Office Action as issued in Chinese Patent Application No, 201310050634.3, dated Dec. 30, 2016.

* cited by examiner

QUARTER WINDOW ASSEMBLY FOR A VEHICLE DOOR AND METHOD OF MAKING THE ASSEMBLY

CROSS REFERENCE TO RELATED APPLICATIONS

This application is the U.S. National Stage of PCT/CN2014/071509, filed Jan. 26, 2014, which in turn claims priorities to Chinese patent application No. 201310050634.3, filed on Feb. 8, 2013, and entitled "METHODS FOR FORMING INJECTION MOLDING COMPONENT AND QUARTER WINDOW, GUIDE RAIL, QUARTER WINDOW, VEHICLE DOOR AND VEHICLE", and Chinese patent application No. 201320072897.X, filed on Feb. 8, 2013, and entitled "GUIDE RAIL FOR GUIDING MOVEMENTS OF VEHICLE WINDOW, QUARTER WINDOW, VEHICLE DOOR AND VEHICLE", the entire disclosures of which are incorporated herein by reference.

TECHNICAL FIELD

The present disclosure generally relates to automobile manufacturing field, and more particularly, to a guide rail embedded in a vehicle door for guiding movements of a vehicle window glass, a quarter window including the guide rail and a method for forming the same, a vehicle door including the quarter window and a vehicle including the vehicle door. In addition, the present disclosure relates to a method for forming an injection molding component.

BACKGROUND

Nowadays, quarter window is widely used in automobiles to improve driver's field of vision or make a vehicle aesthetic in appearance. FIG. 1 schematically illustrates a quarter window mounted on a vehicle door. Referring to FIG. 1, a quarter window 1 is fixed to a vehicle doorframe 2. The quarter window 1 includes a quarter window glass 3, an encapsulation 4 surrounding edges of the quarter window glass 3, and a guide rail 6 for guiding a vehicle window glass 5 to move along a direction indicated by an arrow as shown in FIG. 1. The encapsulation 4 includes at least a first encapsulation section 41, a second encapsulation section 42 and a third encapsulation section 43 to match the shape of the quarter window glass 3. The guide rail 6 is connected with the first encapsulation section 41, as such, the guide rail 6 is fixed to the quarter window glass 3. An encapsulated quarter window glass can be assembled directly in a car production line, which thus shortens assembly cycle. In addition, the encapsulated quarter window glass can be tightly connected with a car body, which thus improves sealing performance and appearance.

FIG. 2 schematically illustrates a structural diagram of the guide rail of the quarter window shown in FIG. 1. Referring to FIG. 2, the guide rail 6 includes a first structure 61 that is adapted to be embedded in the vehicle doorframe, and a second structure 62 that is adapted to be disposed outside the vehicle doorframe and fixed to the first structure 61. Generally, the first structure 61 is integrated with the second structure 62 as a whole. The first structure 61 includes a bottom wall 611, a first side wall 612 disposed on a first surface S1 of the bottom wall 611, and a second side wall 613 disposed on the first surface S1. The second side wall 613 is opposite to the first side wall 612, such that a vehicle window glass can move between the first side wall 612 and the second side wall 613. The first structure 61 of the guide rail 6 as a whole thus takes a U shape. The second structure 62 includes a bottom wall 621, and a first side wall 622 on a first surface S2 of the bottom wall 621. An extension part 63 is disposed on a second surface S3 of the bottom wall 621 of the second structure 62. The second surface S3 is opposite to the first surface S2. Referring to FIG. 1, the extension part 63 is connected with the first encapsulation section 41 of the encapsulation 4, as such, the guide rail 6 is fixed to the quarter window glass 3. After the quarter window 1 is mounted on the vehicle doorframe 2, the quarter window glass 3 and the vehicle window glass 5 are mounted on both sides of the guide rail 6, respectively. In some cases, a groove 631 may be provided within the extension part 63. An opening of the groove 631 may be on a surface S4 of the extension part 63.

Referring to FIG. 1 and FIG. 2, the quarter window 1 may be formed as follows. First, an ordinary annealed glass is cut into a required size. Then, molding and toughening are performed on the glass to obtain the quarter window glass 3. Thereafter, the quarter window glass 3 and the guide rail 6 as inserts are put into a first mold and are positioned therein. Then, a second mold is placed on the first mold, as a result, a cavity for forming the encapsulation 4 is formed between the first mold and the second mold. Thereafter, molten plastics is injected into the cavity, the plastics solidifies and tightly encapsulates the edge of the quarter window glass 3 to form the encapsulation 4. A portion of solidified plastics (which is used to form the first encapsulation section 41) is fixedly connected with the extension part 63 of the guide rail 6, so that the guide rail 6 is fixed to the quarter window glass 3. In order to prevent the molten plastics from entering into the groove 631 of the extension part 63 and avoid an undesired glue overflow structure in the groove 631, the second mold should be pressed against the surface S4 of the extension part 63 during forming the encapsulation 4, such that the second mold may cover the opening of the groove 631 to close up it.

Nevertheless, glue overflow structures are often found in the groove of the guide rail of quarter windows formed using the conventional method, which adversely increases the reject rate of quarter windows. The glue overflow structures may be removed manually to decrease the reject rate, however, which will in turn increase workload and extend the production cycle.

SUMMARY

Embodiments of the present disclosure provide methods and structures to prevent forming glue overflow structures in the groove of the guide rail when forming a quarter window with an injection molding method, so as to improve yield of the quarter window.

In one embodiment, a guide rail for guiding movements of a vehicle window glass is provided, which may include: a first structure which is adapted to be embedded in a doorframe of the vehicle and a second structure which is adapted to be disposed outside the doorframe and fixedly connected with the first structure, wherein the second structure includes a second bottom wall, a side wall disposed on a first surface of the second bottom wall, and an extension part disposed on a second surface of the second bottom wall, wherein the second surface is opposite to the first surface, a groove is disposed within the extension part, and an opening of the groove is disposed on a surface of the extension part; and a protrusion part made of plastics is disposed on the surface of the extension part and surrounds the groove.

In some embodiments, the protrusion part may include polypropylene (PP), polyamide 66 (PA66), a compound of PA66 and glass fibre, polycarbonate (PC), polyformaldehyde (POM) or Acrylonitride Butadiene Styrene (ABS).

In some embodiments, the first structure includes a first bottom wall, a first side wall and a second side wall, wherein the first side wall and the second side wall are disposed on a first surface of the first bottom wall and opposite to each other, wherein one end of the first bottom wall is fixed to one end of the second bottom wall, and one end of the first side wall is fixed to one end of the side wall.

In some embodiments, the guide rail may include a first fixing part, a second fixing part and a third fixing part which are spaced apart and adapted for fixing the guide rail to the doorframe, wherein the second fixing part is disposed between the first fixing part and the third fixing part, the first fixing part is disposed on the second side wall of the first structure, the second fixing part and the third fixing part are disposed on the side wall of the second structure, and the first fixing part, the second fixing part and the third fixing part are provided with a screw hole, respectively.

In some embodiments, the protrusion part may have a substantially triangular, rectangular or trapezoidal cross-sectional shape.

In some embodiments, when the protrusion part has a substantially triangular or rectangular cross-sectional shape, the protrusion part has a height ranging from about 0.1 mm to about 0.5 mm, and a width ranging from about 0.1 mm to about 0.4 mm; and when the protrusion part has a substantially trapezoidal cross-sectional shape, the protrusion part has a height ranging from about 0 limn to about 0.5 mm, a bottom width ranging from about 0.1 mm to about 0.4 mm, and a top width ranging from about 0.1 mm to about 0.4 mm, and the bottom width is greater than the top width.

In some embodiments, the second bottom wall of the second structure is provided with a first opening, a second opening and a third opening, which are spaced apart from each other, wherein the part of the second bottom wall between two adjacent second openings forms a block.

In one embodiment, a quarter window is provided, which includes: a guide rail as described above; a quarter window glass; and an encapsulation surrounding edges of the quarter window glass, wherein the encapsulation includes at least a first encapsulation section, a second encapsulation section and a third encapsulation section, and the first encapsulation section is fixedly connected with the extension part of the guide rail.

Correspondingly, a method for forming a quarter window is provided, which includes:
  providing a quarter window glass and a guide rail as described above;
  positioning the quarter window glass and the guide rail in a first mold;
  covering the first mold with a second mold, wherein a cavity for forming an encapsulation is formed between the first mold and the second mold, and the second mold is pressed on the surface of the extension part and the protrusion part; and
  injecting a molten encapsulation material into the cavity, wherein an encapsulation is formed surrounding edges of the quarter window glass after the encapsulation material is solidified, wherein the encapsulation includes at least a first encapsulation section, a second encapsulation section and a third encapsulation section, and the first encapsulation section is fixedly connected with the extension part of the guide rail.

In one embodiment, a quarter window is provided, which includes:
  a guide rail as described above, wherein the second bottom wall of the second structure is provided with a first opening, a second opening and a third opening, which are spaced apart from each other, wherein the part of the second bottom wall between two adjacent second openings forms a block;
  a trim panel which is fixed to the guide rail, wherein the trim panel includes a clip board embedded in the groove and a third side wall disposed on the clip board, the clip board is provided with a clip adapted for being embedded in the first opening and a fourth opening whose shape matches with the block; wherein the block is adapted for being stuck in the fourth opening, and the third side wall is opposite to the side wall of the second structure of the guide rail;
  a quarter window glass; and
  an encapsulation surrounding edges of the quarter window glass, wherein the encapsulation includes at least a first encapsulation section, a second encapsulation section and a third encapsulation section, and the first encapsulation section is fixedly connected with the extension part of the guide rail.

Correspondingly, a method for forming a quarter window is provided, which includes:
  providing a quarter window glass and a guide rail as described above, wherein the second bottom wall of the second structure is provided with a first opening, a second opening and a third opening, which are spaced apart from each other, wherein the part of the second bottom wall between two adjacent second openings forms a block;
  positioning the quarter window glass and the guide rail in a first mold;
  covering the first mold with a second mold, wherein a cavity for forming an encapsulation is formed between the first mold and the second mold, and the second mold is pressed on the surface of the extension part and the protrusion part;
  injecting a molten encapsulation material into the cavity, wherein an encapsulation is formed surrounding edges of the quarter window glass after the encapsulation material is solidified, the encapsulation includes at least a first encapsulation section, a second encapsulation section and a third encapsulation section, and the first encapsulation section is fixedly connected with the extension part of the guide rail; and
  providing a trim panel, wherein the trim panel includes a clip board embedded in the groove and a third side wall disposed on the clip board, and the clip board is provided with a clip adapted for being embedded in the first opening and a fourth opening whose shape matches with the block;
  wherein when the trim panel is fixed to the guide rail, the clip board is embedded in the groove, and the third side wall is opposite to the side wall of the second structure of the guide rail.

In one embodiment, a method for forming an injection molding component is provided, which includes:
  providing a plurality of separate components including a first component and a second component, wherein a groove is formed within the first component with its opening flush with a surface of the first component, and a protrusion part made of plastics is disposed on the surface of the first component and surrounds the groove;

positioning the plurality of components in a first mold;
covering the first mold with a second mold, wherein a cavity for forming a fixing component is formed between the first mold and the second mold, and the second mold is pressed on the surface of the first component and the protrusion part; and
injecting molten plastics into the cavity, wherein the plastics is solidified to form the fixing component, and the plurality of components are fixed together by the fixing component.

In some embodiments, the protrusion part may include polypropylene (PP), polyamide 66 (PA66), a compound of PA66 and glass fibre, polycarbonate (PC), polyformaldehyde (POM) or Acrylonitride Butadiene Styrene (ABS).

In some embodiments, the protrusion part may have a substantially triangular; rectangular or trapezoidal cross-sectional shape.

In some embodiments, the material of the first component may include plastics, and the material of the second component may include glass.

In one aspect of the present disclosure, a vehicle door is provided, which includes: a doorframe; a quarter window as described above, the quarter window being fixed to the doorframe, wherein the first structure of the guide rail is embedded in the doorframe, and the second structure of the guide rail is disposed outside the doorframe; and a vehicle window glass which is embedded in the doorframe and capable of moving along the guide rail.

In one aspect of the present disclosure, a vehicle is provided, which includes a vehicle door as described above.

Embodiments of the disclosure have the following advantages.

A guide rail for guiding movements of a vehicle window glass is provided with an extension part. A groove with its opening flush with a surface of the extension part is formed within the extension part. The guide rail is further provided with a protrusion part on the surface of the extension part, wherein the protrusion part surrounds the groove and is made of plastics. When the first mold is covered with the second mold, the second mold is pressed on the surface of the extension part and the protrusion part. The protrusion part would deform under forces, which may result in a close contact between the second mold and the extension part, and avoids a gap between the second mold and the extension part adjacent the groove. If injection pressure is great enough, the guide rail may be pushed downwards and the pressure on the protrusion part by the second mold may decrease. As a result, the deformed protrusion part may recover along a direction opposite to where the guide rail is pushed downwards, which may result in a close contact between the second mold and the extension part, avoid a gap being generated between the second mold and the extension part adjacent the groove, and thus avoid glue overflow structures in the groove.

In view of glue overflow structures possibly being formed in a process for forming an injection molding component when using a component having a groove, the component having a groove is provided with a protrusion part made of plastics on a surface of the component. The groove opening is flush with a surface on which the protrusion part is disposed, and the protrusion part surrounds the groove opening. When the first mold is covered with the second mold, the second mold is pressed on the surface of the component having the groove and the protrusion part. The protrusion part would deform under forces, which may result in a close contact between the second mold and the component, and avoid a gap between the second mold and the component adjacent the groove, and thus avoid glue overflow structures in the groove.

DETAILED DESCRIPTION

Figure 1:
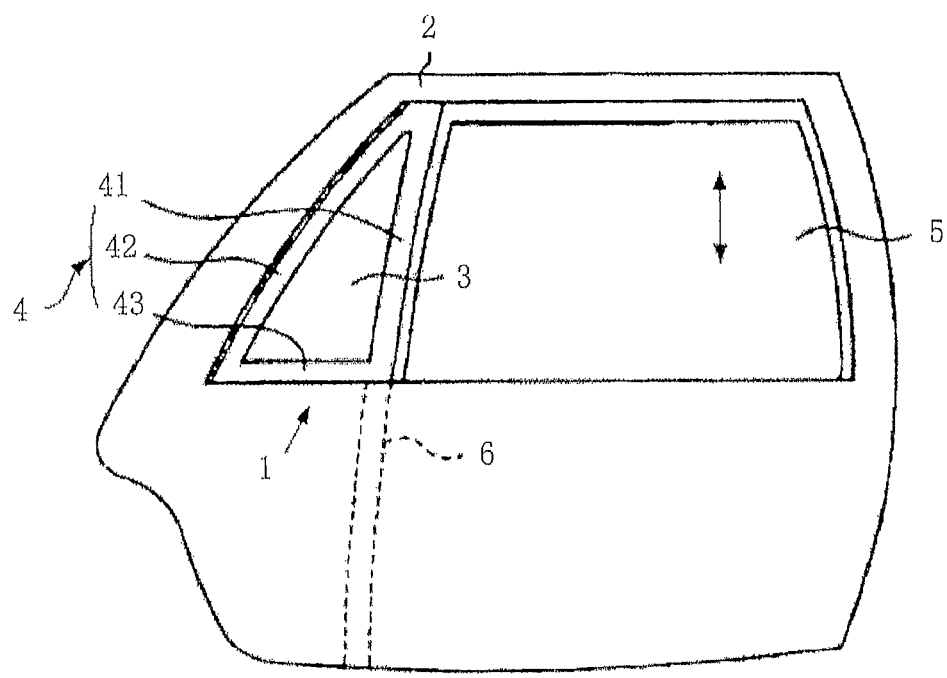
FIG. 1 schematically illustrates a conventional quarter window mounted on a vehicle door.
Figure 2:
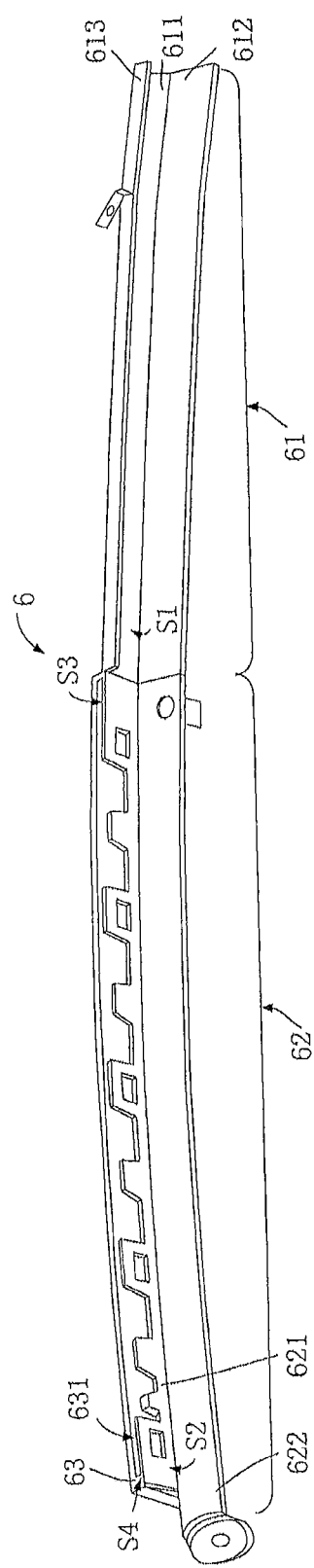
FIG. 2 schematically illustrates a structural diagram of a guide rail of the quarter window shown in FIG. 1.

As described above, glue overflow structures are often found in the groove of the guide rail when the conventional method is used for forming a quarter window, which adversely increases the reject rate of quarter windows.

Inventors of the present disclosure found the causes for forming the glue overflow structures in the groove of the guide rail, which are listed as follows.

Firstly, it is almost unavoidable that there exists manufacturing errors on a guide rail and/or a mold (first mold and second mold), which can not result in a completely close contact between the second mold and the surface of the extension part of the guide rail when the first mold is covered with the second mold. In other words, there is a gap between the second mold and the surface of the extension part of the guide rail, which may enable the plastics to enter into the gap in the process of injection molding.

Secondly, it is almost unavoidable there are positioning errors when the guide rail is positioned in the second mold, which may also cause the second mold not in close contact with the surface of the extension part of the guide rail when the first mold is covered with the second mold. In other words, there is a gap between the second mold and the surface of the extension part of the guide rail, which may lead the plastics to enter into the gap in the process of injection molding.

Thirdly, the guide rail typically has a slightly curved and elongated structure. When the guide rail is positioned in the second mold, only two ends of the guide rail are positioned. That is, only the two ends of the guide rail are supported. Accordingly, the guide rail has poor bend resistance. When the first mold is covered with the second mold, the guide rail is subject to a down force and is prone to bend under the pressure of the second mold. Thus, a gap is generated between the second mold and the surface of the extension part of the guide rail, which may cause the plastics to enter into the gap in the process of injection molding.

Fourthly, when molten plastics are injected into a cavity formed by the first mold and the second mold, the injection pressure is generally huge in order to fill the molten plastics in the cavity completely. However, the guide rail is made of plastics and the extension part surrounding the opening of the groove is an elongated structure, the guide rail is prone to deform under the injection pressure. Thus, a gap is generated between the second mold and the surface of the extension part of the guide rail, which may cause the plastics to enter into the gap in the process of injection molding.

In light of the above, embodiments of the present disclosure provide an improved guide rail. The guide rail is provided with a protrusion part made of plastics, the protrusion part is disposed on the surface of the extension part, the groove opening is on a surface where the protrusion part resides, and the protrusion part surrounds the groove opening. When the first mold is covered with the second mold, the second mold is pressed on the surface of the extension part and the protrusion part. The protrusion part would deform under forces, which may result in a close contact between the second mold and the extension part, and avoids a gap between the second mold and the extension part adjacent the groove. If injection pressure is great enough, the guide rail may be pushed downwards and the pressure on the protrusion part by the second mold may decrease. As a result, the deformed protrusion part may recover along a direction opposite to where the guide rail is pushed downwards, which may result in a close contact between the second mold and the extension part, and avoid a gap between the second mold and the extension part adjacent the groove.

In order to clarify the objects, characteristics and advantages of the disclosure, embodiments of the present disclosure will be described in detail in conjunction with the accompanying drawings. The disclosure will be described with reference to certain embodiments. It will be understood by those skilled in the art that various changes may be made without departing from the spirit or scope of the disclosure. Accordingly, the present disclosure is not limited to the embodiments disclosed.

First, a guide rail for guiding movements of a vehicle window is described in detail hereunder.

Figure 3:
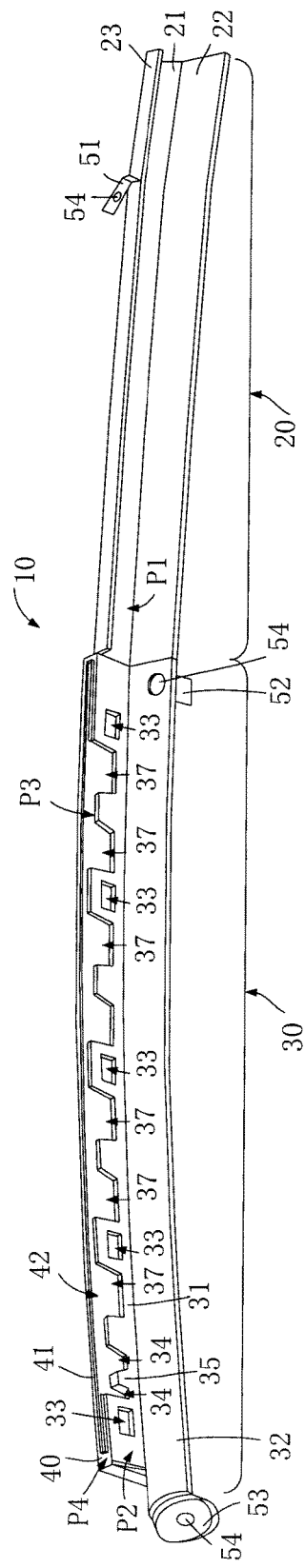
FIG. 3 schematically illustrates a structural diagram of a guide rail according to one embodiment of the present disclosure.

FIG. 3 schematically illustrates a structural diagram of a guide rail according to one embodiment of the present disclosure. Referring to FIG. 3, a guide rail 10 includes a first structure 20 embedded in a vehicle doorframe (not shown) and a second structure 30 disposed outside the doorframe. The first structure 20 and the second structure 30 are fixedly connected with each other, and form an elongated structure. In some embodiments, the first structure 20 and the second structure 30 may be integrated as a whole.

The first structure 20 includes a first bottom wall 21, a first side wall 22 disposed on a first surface P1 of the first bottom wall 21, and a second side wall 23 disposed on the first surface P1. The second side wall 23 is opposite to the first side wall 22, such that a vehicle window glass (not shown) can move between the first side wall 22 and the second side wall 23. The first structure 20 as a whole takes a U cross-sectional shape.

Figure 4:
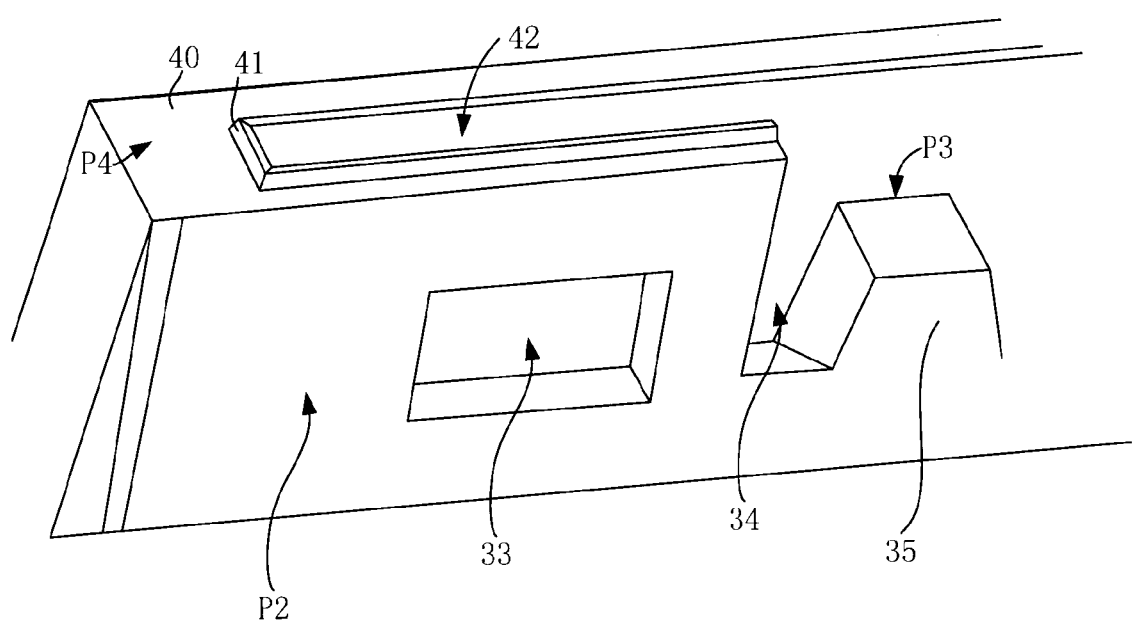
FIG. 4 schematically illustrates a partial enlarged view of the guide rail shown in FIG. 3.

The second structure 30 includes a second bottom wall 31, and a side wall 32 disposed on a first surface P2 of the second bottom wall 31. The second structure 30 as a whole takes an L cross-sectional shape. One end of the first bottom wall 21 is fixed to one end of the second bottom wall 31, and one end of the side wall 32 is fixed to one end of the first side wall 22. FIG. 4 schematically illustrates a partial enlarged view of the guide rail shown in FIG. 3. Referring to FIG. 4, an extension part 40 is disposed on a second surface P3 of the second bottom wall 31. The second surface P3 is opposite to the first surface P2. In some cases, a groove 42 with its opening flush with a surface P4 of the extension part 40 is disposed within the extension part 40. A protrusion part 41 is disposed on a surface P4 of the extension part 40 and surrounds the groove 42. The protrusion part 41 may be disposed exactly on edges of the opening of the groove 42, or, at a certain distance away from edges of the groove 42. It should be noted that the shape and position of the groove 42 in the extension part 40 should not be limited as shown in the figures. In some embodiments, the first structure 20, the second structure 30, the extension part 40 and the protrusion part 41 may be integrated as a whole.

The shape and size of the protrusion part 41 has a decisive impact on whether glue overflow occurs in the groove 42 in the injection molding process of forming a quarter window. Inventors found that appropriate design of the shape and size of the protrusion part 41 to expect no glue overflow in the groove 42, depends on various factors, such as properties of injection molding materials, processing parameters of the injection molding, etc. In light of the various factors, the shape and size of the protrusion part 41 may be designed as follows through tremendous amount of analysis, trials and tests. In some embodiments, the protrusion part may have a cross-sectional shape of triangle, rectangle or trapezoid. The protrusion part 41 may have a height (perpendicular to the surface P4 of the extension part 40) ranging from about 0.1 mm to about 0.5 mm, and a width (parallel to the surface P4 of the extension part 40) ranging from about 0.1 mm to about 0.4 mm, and the protrusion part 41 may have any height and width respectively within that ranges. It should be noted that, when the protrusion part 41 has a substantially triangular cross-sectional shape, the width of the protrusion part 41 is the length of the triangle bottom (against the surface P4 of the extension part 40). When the protrusion part 41 has a substantially trapezoidal cross-sectional shape, the width of the protrusion part 41 is a bottom width (against the surface P4 of the extension part 40) and a top width of the trapezium, and the bottom width is greater than the top width. The protrusion part 41 may be made of plastics, such that the protrusion part 41 may deform under forces. In some embodiments, the protrusion part 41 may be made of common plastics materials in the automobile field, such as polypropylene (PP), polyamide 66 (PA66, also referred to as nylon 66), a compound of PA66 and glass fibre, polycarbonate (PC, also referred to as engineering plastics), polyformaldehyde (POM) or Acrylonitride Butadiene Styrene (ABS). In some embodiments, the protrusion part 41 may be made of other appropriate plastics materials. The guide rail 10 may also be made of common plastics materials in the automobile field, such as PP, PA66, a compound of PA66 and glass fibre, PC, POM or ABS. In some embodiments, the guide rail 10 may be made of other appropriate plastics materials.

Referring to FIG. 3, in order to fix the guide rail 10 to the doorframe, the guide rail 10 is provided with a first fixing part 51, a second fixing part 52 and a third fixing part 53 which are spaced apart from each other. The second fixing part 52 is disposed between the first fixing part 51 and the third fixing part 53. The first fixing part 51 is disposed on the second side wall 23 of the first structure 20. The second fixing part 52 and the third fixing part 53 are disposed on the side wall 32 of the second structure 30. The first fixing part 51, the second fixing part 52 and the third fixing part 53 are respectively provided with a screw hole 54 which may engage with a screw on the doorframe for assembling.

A quarter window and a method for forming the same are described hereinafter.

Figure 5:
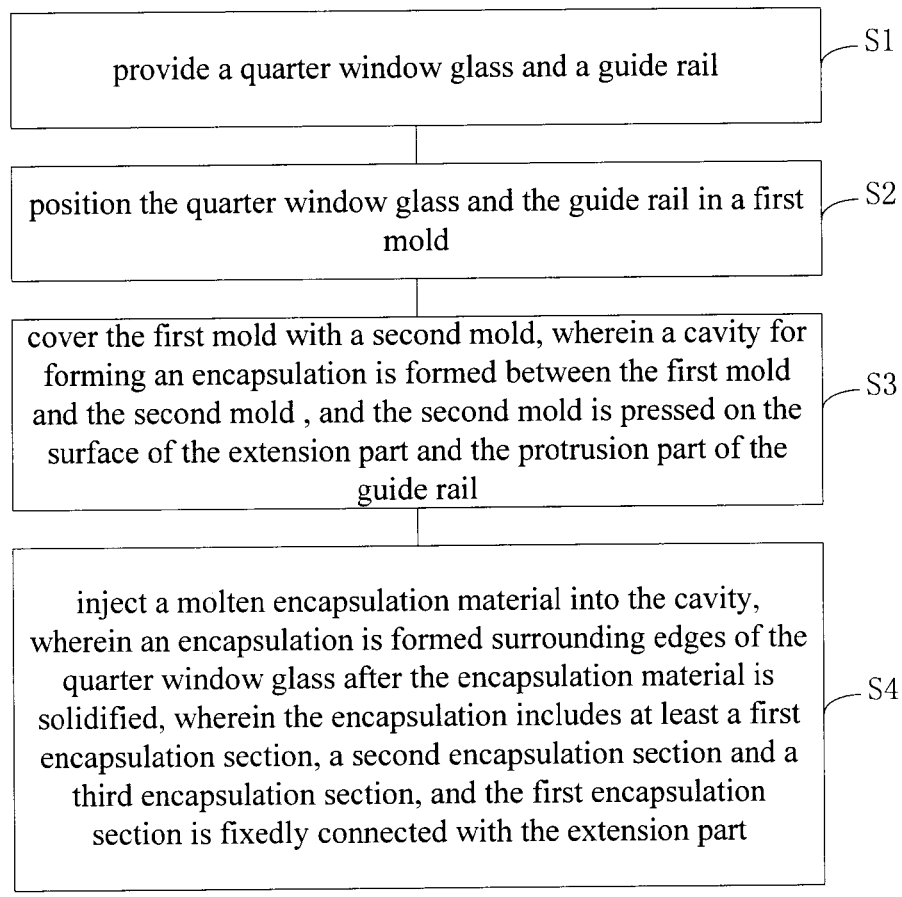
FIG. 5 schematically illustrates a flow chart of forming a quarter window according to one embodiment of the present disclosure.
Figure 6:
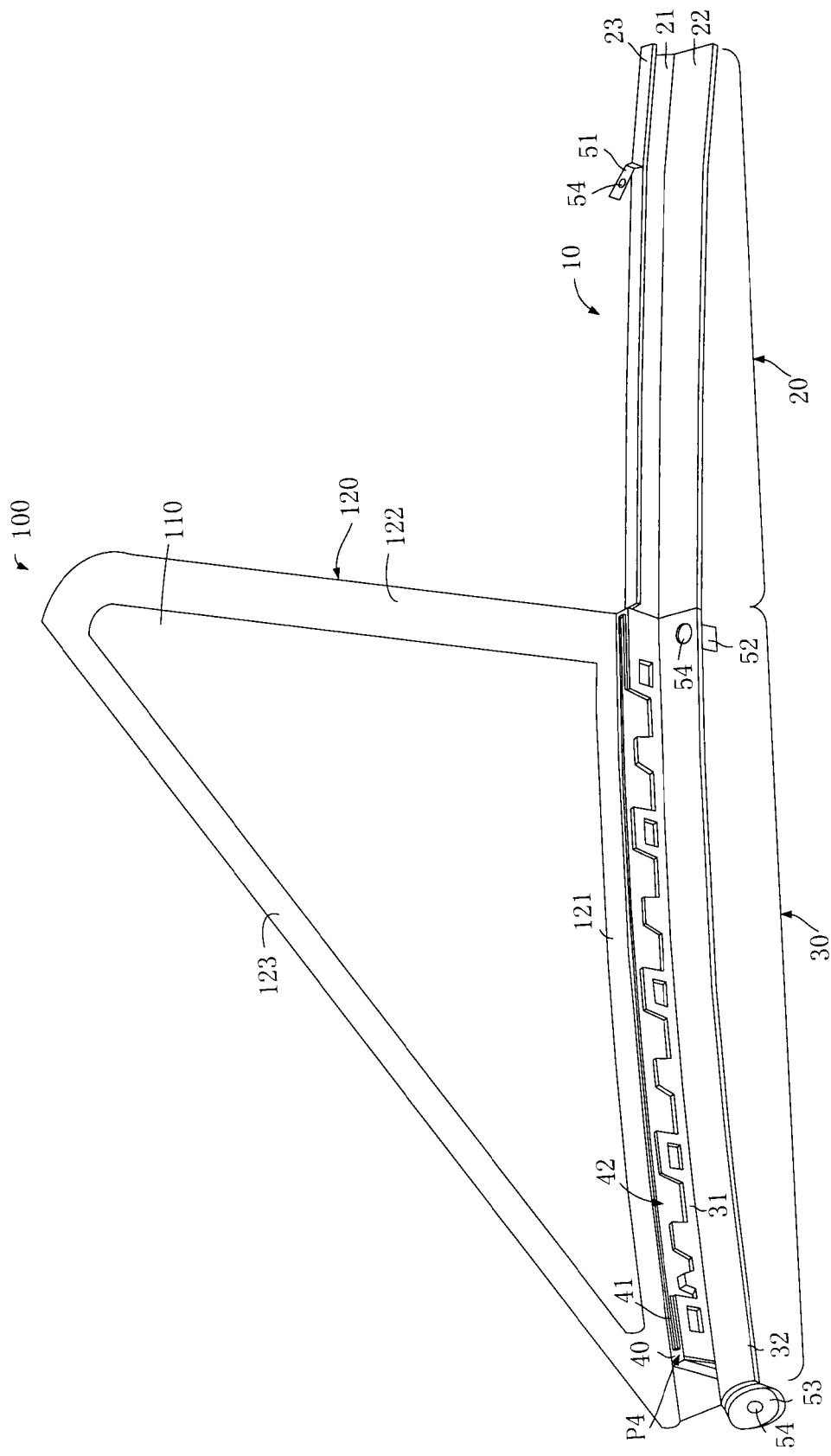
FIG. 6 schematically illustrates a structural diagram of a quarter window according to one embodiment of the present disclosure.

FIG. 5 schematically illustrates a flow chart of forming a quarter window according to one embodiment of the present disclosure. FIG. 6 schematically illustrates a structural diagram of a quarter window according to one embodiment of the present disclosure. Referring to FIG. 5 and FIG. 6, a method for forming the same will be described in detail.

S1, provide a quarter window glass and a guide rail.

The material of the quarter window glass 110 may include glass or transparent plastics. A desirable quarter window glass including glass may be obtained by cutting an ordinary annealed glass into a required size, then, performing molding and toughening on the glass. In this embodiment, the quarter window glass 110 has a triangular shape. In other embodiments, the quarter window glass 110 may have a rectangular shape or other suitable shapes. The guide rail 10 may be any guide rail provided in above embodiments, and will not be described in detail herein.

S2, position the quarter window glass and the guide rail in a first mold.

Specifically, the quarter window glass 110 and the guide rail 10 as inserts are put into a first mold and are positioned in the first mold. After being positioned, the quarter window glass 110 has a fixed position relative to the guide rail 10. The positioning is to prevent the quarter window glass 110 and the guide rail 10 from moving under the dash of molten encapsulation materials in the injection molding process of forming an encapsulation.

S3, cover the first mold with a second mold, wherein a cavity for forming an encapsulation is formed between the first mold and the second mold, and the second mold is pressed on the surface of the extension part and the protrusion part of the guide rail.

After a second mold covers the first mold, a cavity is formed between the first mold and the second mold. The shape of the cavity is designed depending on the shape of the encapsulation. The cavity is located at edges of the quarter window glass 110. In the step S2, the second mold is used to shield some structures of the guide rail 10, so as to block the encapsulation materials in the subsequent injection molding process to avoid generating waste products. In order to connecting the quarter window glass 110 with the guide rail 10 as a whole, encapsulation materials may be filled between the quarter window glass 110 and the extension part 40 of the guide rail 10 in the subsequent injection molding process. However, no encapsulation material is expected in the groove 42 of the extension part 40. Accordingly, the second mold is used to shield the groove 42. In other words, the second mold needs to surround the opening of the groove 42, such that a closed space is formed in the groove 42.

Specifically, after the second mold is placed on the first mold, the second mold is pressed on the surface P4 of the extension part 40. As the protrusion part 41 is also on the surface P4 of the extension part 40, the second mold is also pressed on the protrusion part 41. If there exists a gap between the second mold and the extension part 40 in some cases where the guide rail 10, the first mold and the second mold have manufacturing errors, or there are positioning errors when positioning the guide rail 10 in the second mold, or the guide rail has poor bend resistance when the first mold is covered with the second mold, the protrusion part 41 on the extension part 40 can fill the gap, so as to compensate for the manufacturing errors of the guide rail 10, the first mold and the second mold, the positioning errors of the guide rail 10, and the bend resistance performance of the guide rail 10. In addition, the protrusion part 41 will deform under forces, which makes the second mold closely contact with the extension part 40, thereby preventing a gap from being generated between the second mold and the extension part 40 adjacent the groove 42.

From above, to enable the protrusion part 41 deform under forces and to ensure a close contact between the second mold and the extension part 40, the shape and the size of the protrusion part 41 play an important role.

S4, inject a molten encapsulation material into the cavity, wherein an encapsulation is formed surrounding edges of the quarter window glass after the encapsulation material is solidified, the encapsulation includes at least a first encapsulation section, a second encapsulation section and a third encapsulation section, and the first encapsulation section is fixedly connected with the extension part of the guide rail.

Under a given injection pressure, a molten encapsulation material is injected into the cavity. The encapsulation material surrounds edges of the quarter window glass 110. The encapsulation material also fills the space between the quarter window glass 110 and the extension part 40 of the guide rail 10. After the encapsulation material solidifies, it surrounds edges of the quarter window glass 110 and an encapsulation 120 is formed. In the meantime, the encapsulation material filling the space between the quarter window glass 110 and the extension part 40 solidifies and connects them together, which thus integrates the guide rail 10 with the quarter window glass 110 as a whole. The encapsulation 120 includes at least a first encapsulation section 121, a second encapsulation section 122 and a third encapsulation section 123. If the quarter window glass 110 has a rectangular shape or other polygonal shapes, the encapsulation 120 may include other encapsulation sections correspondingly. The first encapsulation section 121 is fixedly connected with the extension part 40 of the guide rail 10. The encapsulation material may include Thermoplastic Elastomer (TPE), Polyvinylchlorid (PVC), Polyurethane (PU), or Ethylene Propylene Diene Monomer (EPDM).

Typically, the molten encapsulation material is injected into the cavity under a huge injection pressure. Under the huge injection pressure, the guide rail tends to deform to generate a gap between the second mold and the extension part 40. As there is a protrusion part on the surface of the extension part, when the guide rail is pushed downwards under the injection pressure, the protrusion part is subject to a smaller pressure than the injection pressure by the second mold. As a result, the deformed protrusion part may recover along a direction opposite to where the guide rail is pushed downwards, which makes the second mold closely contact with the extension part 40, avoids a gap being generated between the second mold and the extension part 40 adjacent the groove 42, and thus avoids glue overflow structures in the groove 42.

As described above, the shape and size of the protrusion part 41 have important effects on whether glue overflow occurs in the groove 42 in the injection molding process of forming a quarter window. When the protrusion part 41 is designed according to the above embodiments (e.g., the protrusion part has a substantially triangular, rectangular or trapezoidal cross-sectional shape; the protrusion part 41 has a height ranging from about 0.1 mm to about 0.5 mm, and a width ranging from about 0.1 mm to about 0.4 mm), injection molding experiments are performed many times using a guide rail having such protrusion part and following results are found: in the injection molding process of a quarter window, the second mold can contact closely with the extension part 40, a gap can be prevented from being generated in the groove 42 between the second mold and the extension part 40, and thus glue overflow structures in the groove 42 can be avoided. On the contrary, when the protrusion part 41 has a height and/or a width not within the range mentioned above (for example, the protrusion part 41 has a width greater than 0.4 mm), glue overflow structures may be generated in the groove 42 in the injection molding process of a quarter window.

After the encapsulation material solidifies, the quarter window is taken out of the mold. In some cases, it is found that the protrusion part 41 on the extension part 40 collapses after the quarter window is taken out of the first mold and the second mold. For example, although the protrusion part has a triangular, rectangular or trapezoidal cross-sectional shape before the quarter window is put in the first mold, the protrusion part often deforms after an injection molding process and no longer takes the triangular, rectangular or trapezoidal cross-sectional shape.

Referring to FIG. 6, the quarter window 100 includes: a guide rail 10, a quarter window glass 110 and an encapsulation 120 surrounding edges of the quarter window glass 110, wherein the encapsulation 120 includes at least a first encapsulation section 121, a second encapsulation section 122 and a third encapsulation section 123. The first encapsulation section 121 is fixedly connected with the extension part 40 of the guide rail 10, as such, the quarter window glass 110 is fixed to the guide rail 10. If the quarter window glass 110 has a rectangular shape or other polygonal shapes, the encapsulation 120 may include other encapsulation sections correspondingly.

Figure 7:
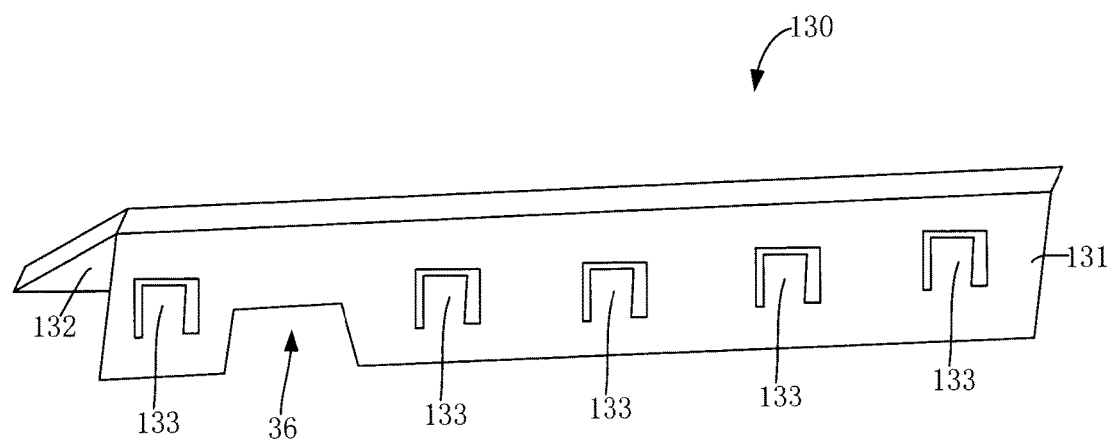
FIG. 7 schematically illustrates a structural diagram of a trim panel of the quarter window according to one embodiment of the present disclosure.
Figure 9:
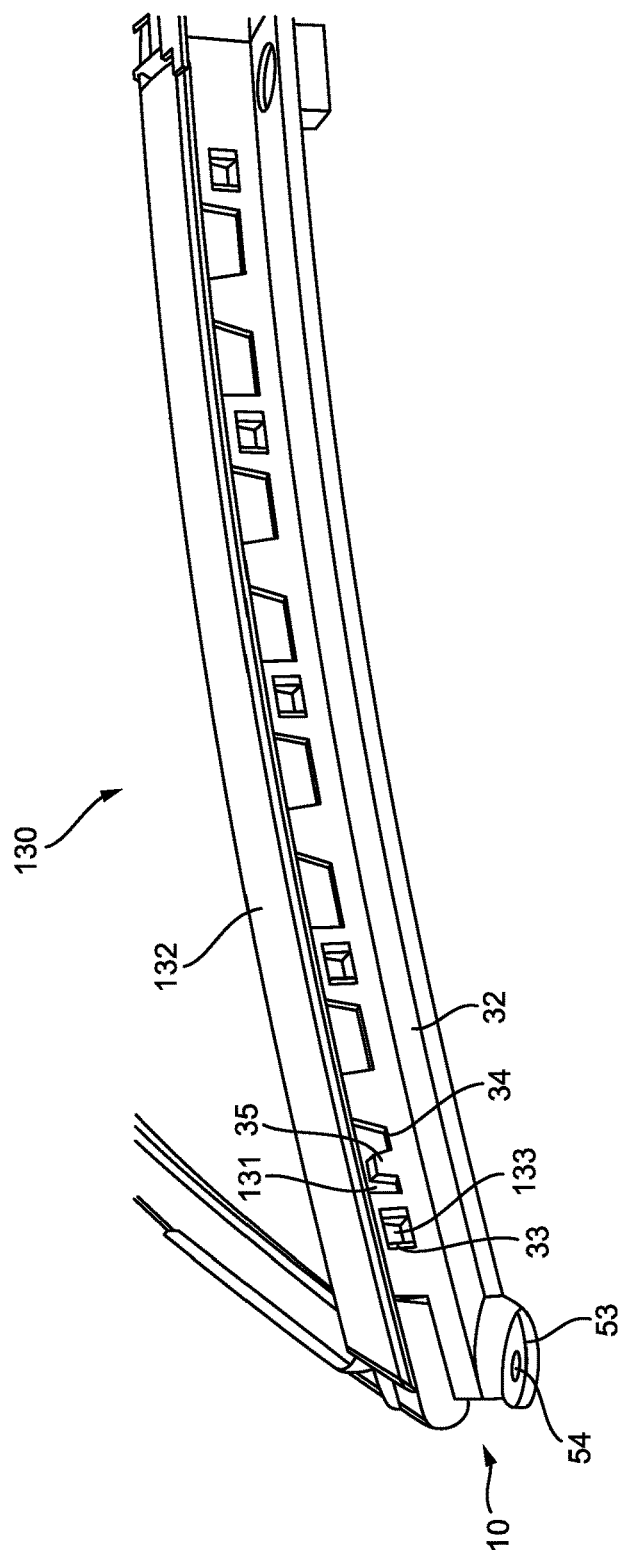
FIG. 9 schematically illustrates a trim panel that comprises a clip board embedded in the groove of the second structure of the guide rail.

FIG. 7 schematically illustrates a structural diagram of a trim panel of the quarter window according to one embodiment of the present disclosure. Referring to FIG. 4, FIG. 6 and FIG. 7 collectively, after the quarter window 100 is manufactured using the above method, a trim panel 130 is fixed in the guide rail 10. The trim panel 130 may have an L cross-sectional shape. The trim panel 130 includes a clip board 131 adapted for being embedded in the groove 42, and a third side wall 132 adapted for being disposed on the clip board 131. When the clip board 131 is fixed in the groove 42, the third side wall 132 is opposite to the side wall 32 of the second structure 30 of the guide rail 10, as such, the vehicle window glass can move between the third side wall 132 and the side wall 32. The trim panel 130 and the guide rail 10 collectively take a U-shape. FIG. 9 schematically illustrates the trim panel 130 that comprises the clip board 131 embedded in the groove of the second structure of the guide rail 10.

In order to fix the clip board 131 in the groove 42, the second bottom wall 31 of the second structure 30 of the guide rail 10 may be provided with spaced a first opening 33 and a second opening 34. The first opening 33 and the second opening 34 penetrate through the top and bottom surfaces of the second bottom wall 31. Referring to FIG. 4, there are 5 first openings 33, and 2 second openings 34. The part of the second bottom wall 31 between two adjacent second openings 34 forms a block 35. Correspondingly, the clip board 131 is provided with a clip 133 adapted for being embedded in the first opening 33 and a fourth opening 36 whose shape matches with the block 35. When the clip board 131 is inserted in the groove 42, the clip 133 is stuck to the second bottom wall 31 around the first opening 33, so as to restrict movements of the trim panel 130 along a first direction. Further, the block 35 is stuck in the fourth opening 36, so as to restrict movements of the trim panel 130 along a second direction. In addition, the second bottom wall 31 can restrict movements of the trim panel 130 along a third direction. The first direction, second direction and third direction are perpendicular to each other, which thus fixes the clip board 131 within the groove 42.

To lower the weight of the guide rail 10, a plurality of spaced third openings 37 may be formed on the second bottom wall 31 of the second structure 30 of the guide rail 10. Referring to FIG. 4, there are 7 third openings 37.

In some embodiments, a method for forming a quarter window is provided. The method may include steps S1' to S5'.

S1', provide a quarter window glass and a guide rail;

S2', position the quarter window glass and the guide rail into a first mold;

S3', cover the first mold with a second mold, wherein a cavity for forming an encapsulation is formed between the first mold and the second mold, and the second mold is pressed on a surface of an extension part and a protrusion part;

S4', inject a molten encapsulation material into the cavity, wherein an encapsulation is formed surrounding edges of the quarter window glass after the encapsulation material is solidified, the encapsulation includes at least a first encapsulation section, a second encapsulation section and a third encapsulation section, and the first encapsulation section is fixedly connected with the extension part of the guide rail; and S5', provide a trim panel, wherein the trim panel includes a clip board embedded in the groove, and a third side wall disposed on the clip board, wherein the clip board is provided with a clip adapted for being embedded in the first opening and a fourth opening whose shape matches with the block, wherein when the trim panel is fixed to the guide rail, the clip board is embedded in the groove, and the third side wall is opposite to the side wall of the second structure of the guide rail.

Correspondingly, the quarter window 100 fabricated using the above method includes a guide rail 10; a trim panel 130 as described above, which is fixed to the guide rail 10; a quarter window glass 110 and an encapsulation 120 surrounding edges of the quarter window glass 110, wherein the encapsulation 120 includes at least a first encapsulation section 121, a second encapsulation section 122 and a third encapsulation section 123. The first encapsulation section 121 is fixedly connected with the extension part 40 of the guide rail 10, such that the quarter window glass 110 is fixed to the guide rail 10. If the quarter window glass 110 has a rectangular shape or other polygonal shapes, the encapsulation 120 may include other encapsulation sections correspondingly.

After a quarter window having a trim panel is mounted on a vehicle door, if there is a need to adjust the gap between the top of the trim panel and the doorframe, only the trim panel needs to be modified or only the block of the guide rail needs to be adjusted, which is easy to operate. However, the conventional guide rail is integrated with the trim panel as a whole, after the guide rail and the trim panel are fixed on the vehicle door, if the gap between the top of the trim panel and the doorframe needs to be adjusted, molds for forming the guide rail have to be modified completely, which is extraordinarily complicated.

The encapsulated quarter window glass can be assembled directly in a car production line, thus assembly cycle can be shortened. In addition, the encapsulated quarter window glass can be tightly connected with a car body, which thus improves sealing performance and appearance.

Figure 8:
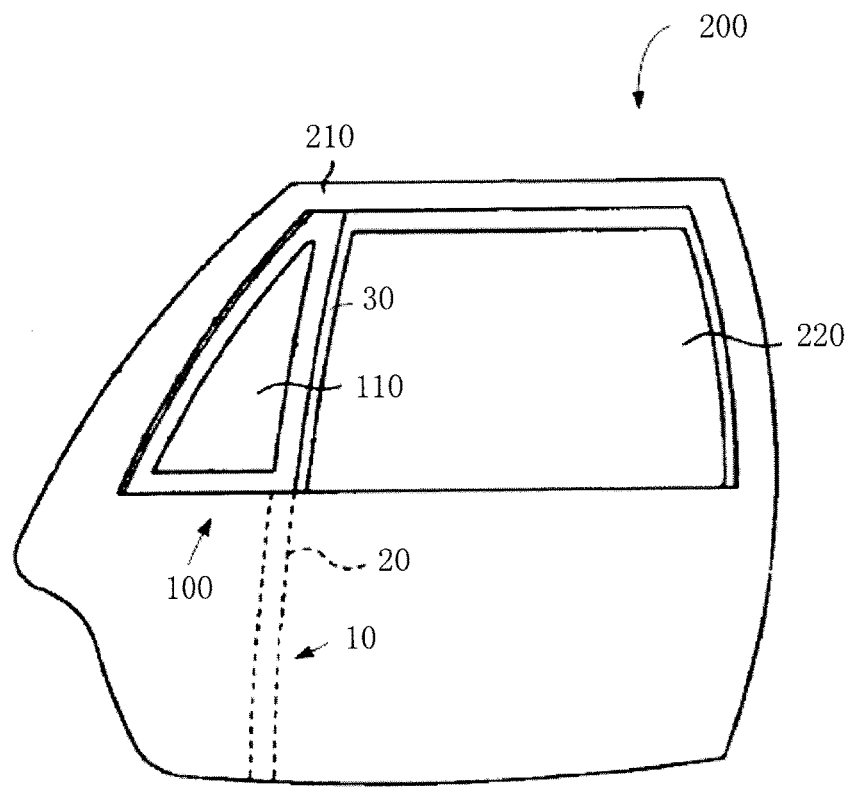
FIG. 8 schematically illustrates a structural diagram of a vehicle door according to one embodiment of the present disclosure.

In one embodiment, a vehicle door is provided. FIG. 8 schematically illustrates a structural diagram of a vehicle door according to one embodiment of the present disclosure. Referring to FIG. 8 and FIG. 6, a vehicle door 200 includes: a doorframe 210; a quarter window 100 fixed to the doorframe 210; a vehicle window glass 220 embedded in the doorframe 210, wherein the vehicle window glass 220 can move along a guide rail 10. The quarter window 100 includes the guide rail 10, wherein the first structure 20 of the guide rail 10 is embedded in the doorframe 210, and the second structure 30 of the guide rail 10 is disposed outside the doorframe 210. The quarter window glass 110 and the vehicle window glass 220 are disposed on opposite sides of the guide rail 10. Referring to FIG. 6, the first bottom wall 21 and the second bottom wall 31 of the guide rail 10 are substantially perpendicular to the quarter window glass 110 and the vehicle window glass 220. The first side wall 22 and side wall 32 of the guide rail 10 are located at the inner side of the vehicle door 200, while the second side wall 23 of the guide rail 10 is located at the outer side of the vehicle door 200. The quarter window 100 can be fixed to the doorframe 210 by fastening screws of the doorframe 210 in the screw holes 54 of the first fixing part 51, the second fixing part 52 and the third fixing part 53 of the guide rail 10.

With reference to FIG. 7, if the quarter window 100 is provided with the trim panel 130, the trim panel 130 is located outside the vehicle door 200 after the quarter window 100 is fixed to the doorframe 210.

In some embodiments, a vehicle is provided, which includes a vehicle door as described above.

Two or more than two separate components can be connected with each other through an injection molding process. However, there may be following cases in an injection molding process: at least a groove may be formed within one of the components, an opening of the groove is flush with the surface of the component, and plastics may enter into the groove in the injection molding process, which is undesirable in actual practice. Accordingly, there is a need to seal the groove. In existing technologies, the groove sealing property is greatly improved through mold design. However, affected by various factors, such as manufacturing errors of the components and a mold, positioning errors of the components, and high injection pressure, the groove can not achieve a satisfactory sealing property, which may cause plastics to enter into the groove. To solve this problem, a protrusion part made of plastics may be disposed on the surface of the component which has a groove, and the protrusion part surrounds the opening of the groove.

In light of the above, a method for forming an injection molding component is provided. The method includes steps S10, S20, S30 and S40.

S10, provide a plurality of (two or more than two) separate components including a first component and a second component, wherein the first component has a groove with its opening flush with a surface of the first component, a protrusion part is disposed on the surface of the first component, and the protrusion part surrounds the groove and is made of plastics.

Under forces, the protrusion part made of plastics would deform. The protrusion part has a substantially triangular, rectangular or trapezoidal cross-sectional shape. In some embodiments, the protrusion part may have other shapes which are easy to be molded. For easy deformation, the size of the protrusion part needs to be designed appropriately. The protrusion part may be made of common plastics materials, such as PP, PA66, a compound of PA66 and glass fibre, PC, POM or ABS.

S20, position the plurality of components in a first mold.

The plurality of components as inserts are put into a first mold, and are positioned in the first mold. After being positioned, the plurality of components have a fixed position relative to each other. The positioning is to prevent the components from moving under the dash of molten plastics in a subsequent injection molding process.

S30, cover the first mold with a second mold, wherein a cavity for forming a fixing component is formed between the first mold and the second mold, and the second mold is pressed on the surface of the first component and the protrusion part.

After the first mold is covered with a second mold, a cavity is formed between the first mold and the second mold. The shape of the cavity is designed depending on the shape of a fixing component which is used to connect the first component with the second component. In the injection molding process, no plastics are expected in the groove of the first component. Accordingly, the second mold is used to shield the groove. In other words, the second mold needs to surround the opening of the groove to close the groove.

Specifically, after the second mold is placed on the first mold, the second mold is pressed on the surface of the first component. As the protrusion part is also on the surface of the first component, the second mold is also pressed on the protrusion part. If there exists a gap between the second mold and the first component, for example, in the case that the components and the molds have manufacturing errors, or the components have positioning errors, the protrusion part on the surface of the first component can fill the gap, so as to compensate for the manufacturing errors and the positioning errors. In addition, the protrusion part will deform under forces, which may result in a close contact between the second mold and the extension part, and avoid a gap between the second mold and the first component adjacent the groove.

S40, inject molten plastics into the cavity, wherein the plastics is solidified to form the fixing component, and the plurality of components are fixed together by the fixing component.

After the plastics is solidified, the plurality of components are connected together to form an injection molding component. When the injection molding component is taken out of the first and second molds, it is often found that the protrusion part on the first component collapses, which makes the shape of the protrusion part different from that before the first component is put in the first and second molds. For example, although the protrusion part has a triangular, rectangular or trapezoidal cross-sectional shape before it is put in the first mold, it deforms after an injection molding process and no longer takes the triangular, rectangular or trapezoidal cross-sectional shape.

It should be noted that, apart from the first component, other components of the plurality of components may have grooves and protrusion parts formed surrounding the grooves, which is not described in detail herein.

In some embodiments, the material of the first component may include plastics, and the material of the second component may include glass.

In conclusion, embodiments of the disclosure have the following advantages.

A guide rail for guiding movements of a vehicle window glass is provided with an extension part. A groove with its opening flush with a surface of the extension part is formed within the extension part. The guide rail is further provided with a protrusion part on the surface of the extension part, wherein the protrusion part surrounds the groove and is made of plastics. When the first mold is covered with the second mold, the second mold is pressed on the surface of the extension part and the protrusion part. The protrusion part would deform under forces, which may result in a close contact between the second mold and the extension part, and avoids a gap between the second mold and the extension part adjacent the groove. If injection pressure is great enough, the guide rail may be pushed downwards and the pressure on the protrusion part by the second mold may decrease. As a result, the deformed protrusion part may recover along a direction opposite to where the guide rail is pushed downwards, which may result in a close contact between the second mold and the extension part, avoid a gap between the second mold and the extension part adjacent the groove, and thus avoid glue overflow structures in the groove.

In view of glue overflow structures possibly being formed in a process for forming an injection molding component when using a component having a groove, the component having a groove is provided with a protrusion part made of plastics on a surface of the component. The groove opening is on a surface where the protrusion part resides, and the protrusion part surrounds the groove opening. When the first mold is covered with the second mold, the second mold is pressed on the surface of the component having the groove and the protrusion part. The protrusion part would deform under forces, which may result in a close contact between the second mold and the component, and avoid a gap between the second mold and the component adjacent the groove, and thus avoid glue overflow structures in the groove.

Although the present disclosure has been disclosed above with reference to preferred embodiments thereof, it should be understood that the disclosure is presented by way of example only, and not limitation. Those skilled in the art can modify and vary the embodiments without departing from the spirit and scope of the present disclosure.

I claim:

1. A quarter window, comprising:
    a guide rail, comprising a first structure which is adapted to extend below a beltline of a vehicle door and a second structure which is adapted to extend above the beltline of the vehicle door and is fixedly connected with the first structure,
        wherein the second structure comprises a bottom wall, a side wall disposed on a first surface of the bottom wall, and an extension part disposed on a second surface of the bottom wall,
        wherein the second surface is opposite to the first surface; wherein a groove is formed by the bottom wall and the extension part, and wherein said groove has an opening that is defined by a surface of the extension part and a surface of the bottom wall; and a protrusion part made of plastic is disposed on the surface of the extension part and partially surrounds the opening of the groove;
        wherein the bottom wall of the second structure is provided with at least a first opening, two second openings and a third opening, wherein a part of the bottom wall between the two second openings forms a block;
    a trim panel is fixed to the guide rail and comprises a clip board embedded in the groove, wherein the clip board defines a side wall, and wherein the clip board is provided with a clip adapted for being positioned in the first opening, the clip board further having a fourth opening whose shape approximates a shape of the block; wherein the block is adapted for being arranged in the fourth opening, and the side wall defined by the clip board is opposite to the side wall of the second structure of the guide rail;
    a quarter window glass; and
    an encapsulation surrounding edges of the quarter window glass, wherein the encapsulation comprises at least a first encapsulation section, a second encapsulation section and a third encapsulation section, and the first encapsulation section is fixedly connected with the extension part of the guide rail.

2. The quarter window according to claim 1, wherein the protrusion part comprises a material selected from the group consisting of polypropylene, polyamide 66, a compound of polymide 66 and glass fibre, polycarbonate, polyformaldehyde and Acrylonitride Butadiene Styrene.

3. The quarter window according to claim 1, wherein the first structure comprises a second bottom wall, a first side wall and a second side wall, wherein the first side and second side walls of the first structure are disposed on a surface of the second bottom wall and opposite to each other, wherein one end of the first bottom wall is fixed to one end of the bottom wall of the second structure, and one end of the first side wall of the first structure is fixed to one end of the side wall of the second structure.

4. The quarter window according to claim 3, comprising a first fixing part, a second fixing part and a third fixing part, wherein the first, second and third fixing parts are spaced apart from each other and are adapted for fixing the guide rail to a doorframe of the vehicle door,
    wherein the second fixing part is disposed between the first fixing part and the third fixing part, the first fixing part is disposed on the second side wall of the first structure, the second fixing part and the third fixing part are disposed on the side wall of the second structure, and each of the first fixing part, the second fixing part and the third fixing part is provided with a screw hole respectively.

5. The quarter window according to claim 1, wherein the protrusion part has a cross-sectional shape that is selected from the group consisting of a substantially triangular cross-sectional shape, a substantially rectangular cross-sectional shape and a substantially trapezoidal cross-sectional shape.

6. The quarter window according to claim 5, wherein
    when the protrusion part has the substantially triangular or rectangular cross-sectional shape, the protrusion part has a height, measured from the surface of the extension part, ranging from about 0.1 mm to about 0.5 mm, and a bottom cross-section width, measured at a bottom of the protrusion part, ranging from about 0.1 mm to about 0.4 mm; and
    when the protrusion part has the substantially trapezoidal cross-sectional shape, a height of the protrusion part having the substantially trapezoidal cross-sectional shape, measured from the surface of the extension part, ranges from about 0.1 mm to about 0.5 mm, a bottom cross-section width of the protrusion part having the substantially trapezoidal cross-sectional shape, measured at the bottom of the protrusion part, ranges from about 0.1 mm to about 0.4 mm, and a top cross-section width, measured at a top of the protrusion part, ranges from about 0.1 mm to about 0.4 mm, and the bottom cross-section width of the protrusion part having the substantially trapezoidal cross-sectional shape is greater than the top cross-section width.

7. A method for forming a quarter window, comprising:
    providing a quarter window glass and a guide rail, the guide rail comprising a first structure which is adapted to extend below a beltline of a vehicle door and a second structure which is adapted to extend above the beltline of the vehicle door and is fixedly connected with the first structure, wherein the second structure comprises a bottom wall, a side wall disposed on a first surface of the bottom wall, and an extension part disposed on a second surface of the bottom wall, wherein the second surface is opposite to the first surface; wherein a groove is formed by the bottom wall and the extension part, and wherein said groove has an opening that is defined by a surface of the extension part and a surface of the bottom wall; and a protrusion part made of plastic is disposed on the surface of the extension part and partially surrounds the opening of the groove;

wherein the bottom wall of the second structure is provided with a first opening, two second openings and a third opening, wherein a part of the bottom wall between the two second openings forms a block;

positioning the quarter window glass and the guide rail in a first mold;

covering the first mold with a second mold, wherein a cavity for forming an encapsulation is formed between the first mold and the second mold, and the second mold is pressed on the protrusion part and the surface of the extension part;

injecting a molten encapsulation material into the cavity, wherein the encapsulation is formed surrounding edges of the quarter window glass after the encapsulation material has solidified, the encapsulation comprises at least a first encapsulation section, a second encapsulation section and a third encapsulation section, and the first encapsulation section is fixedly connected with the extension part of the guide rail; and providing a trim panel, wherein the trim panel comprises a clip board embedded in the groove and wherein the clip board defines a side wall, and wherein the clip board is provided with a clip adapted for being positioned in the first opening, the clip board further having a fourth opening whose shape approximates a shape of the block, wherein the block is adapted for being arranged in the fourth opening;

wherein when the trim panel is fixed to the guide rail, the clip board is embedded in the groove, and the side wall defined by the clip board is opposite to the side wall of the second structure of the guide rail.

8. The method according to claim 7, wherein the protrusion part comprises a material selected from the group consisting of polypropylene, polyamide 66 , a compound of polymide 66 and glass fibre, polycarbonate, polyformaldehyde and Acrylonitride Butadiene Styrene.

9. The method according to claim 7, wherein the protrusion part has a cross-sectional shape that is selected from the group consisting of a substantially triangular cross-sectional shape, a substantially rectangular cross-sectional shape and a substantially trapezoidal cross-sectional shape.

10. A vehicle door, comprising:
a doorframe;
a quarter window according to claim 1, the quarter window being fixed to the doorframe, wherein the first structure of the guide rail extends below the beltline of the vehicle door, and the second structure of the guide rail extends above the beltline of the vehicle door; and
a vehicle window glass which is movably disposed in the doorframe and capable of moving along the guide rail.

11. A vehicle, comprising the vehicle door of claim 10.

* * * * *